United States Patent Office 2,853,380
Patented Sept. 23, 1958

2,853,380

METHOD OF RECOVERING METAL VALUES FROM SOLUTIONS

David J. I. Evans and Peter Tao-I Chiang, Edmonton, Alberta, Canada, assignors to Sherritt Gordon Mines Limited, Toronto, Ontario, Canada, a company of Canada No Drawing. Application May 20, 1957
Serial No. 660,092

6 Claims. (Cl. 75—109)

This invention relates to the production of a metal as metal powder from solutions or slurries in which the metal of interest is present as a metal compound by reacting the solution or slurry with a rdeucing gas at elevated temperature and pressure. The invention is particularly directed to the production of a metal of the group consisting of copper, nickel and cobalt as metal powder.

Hydrometallurgical methods of extracting desired metals from metal bearing materials and dissolving them in a leach solution are well known and are widely used. Also, methods of precipitating values of meal from solutions, such as by cementation and by chemical precipitation, are well known and are widely used. The recovery of desired metal values present in a solution presents an important problem in that the metal values are precipitated as metal compounds which, usually, must be subjected to further treatment to recover the desired metals in metallic state substantially free from impurities.

There recently has ben developed a method, which is described in detail in Patent No. 2,734,821, issued February 14, 1956, of producing metal in powder form from a solution which contains such metal as a soluble metal compound by reacting the solution with a sulphur-free reducing gas at elevated temperature and pressure. Metals which have an oxidation-reduction potential between that of cadmium and silver in the electromotive series of the elements and which are capable of forming, with ammonia in aqueous solution a complex cation can be precipitated by this method as metal powder substantially free from impurities.

This method of producing metals by gas reduction from solutions or slurries in which the desired metals are present as compounds has been subjected to exhaustive investigation leading to the discovery of operating conditions, catalysts and promoters by means of which optimum results can be obtained in the large scale commercial operation of the process.

There is a problem in the production of metals from solutions or slurries by gas reduction. An objective of the overall method is to produce metal in the form of powder or particles which are substantially free from impurities and which are in a finely divided, free flowing state. Agglomeration of particles and/or plastering or deposition on the walls of the reaction vessel or on the agitator employed to retain the particles in suspension create a problem in discharging the metal product from the reaction vessel. Also, the agglomerates tend to entrain unreacted solution, compounds and oxides which have not been reduced to metal. Also, the product is not in a form sufficiently finely divided for use in powder metallurgy applications. The problem of agglomeration and plastering is particularly acute in the production of metals such as silver and copper which precipitate very rapidly from an aqueous solution under moderately elevated temperature and pressure conditions. It is present but has been largely overcome in the production of nickel and cobalt by adding to the solution a finite amount of a member of the group consisting of higher fatty acids and salts thereof and compounds containing higher fatty acids and salts thereof. This latter procedure, however, does not solve the problem of agglomeration and plastering in the production of silver and copper.

For the purpose of the present invention, agglomeration of the metal particles is considered as the bonding together of small particles into particles of greater dimensions. The resulting agglomerates are more resistant to rupture than particles held together by forces controlling flocculation, thus indicating the existence of a metallic bond between individual particles of the agglomerate. "Plastering" is considered as the bonding of minute particles as a layer on the walls of the reaction vessel and associated parts of the apparatus, such as the impellers, exposed to the solution during the reducing reaction. This plastering or plating appears to be characterized by a continuous metallic bond between individual particles which is also resistant to rupture. "Flocculation" is loose adhesion of individual particles into floccules which are easily ruptured into the individual particles.

An important object of this invention is to provide an improvement in the production of metals, particularly copper and silver, from solutions and slurries by reacting the solution or slurry with a sulphur-free reducing gas at elevated temperature and pressure whereby agglomeration of metal particles and their plastering on the walls of the reaction vessel are substantially minimized and the physical characteristics of the product metal powder are substantially improved.

We have found that the objects of this invention can be attained by providing in the solution or slurry subjected to the reducing reaction a finite amount of an addition agent which functions to lessen the surface activity of the metal particles and to lessen the tnedency of metal particles in contact with one another to become bonded together by a continuous metallic bond. We have found, also, that the amount of particle growth by agglomeration during the reducing reaction can be controlled by the amount of addition agent provided in the solution. Addition agents which have been found to be suitable for the purposes of the present invntion are acrylic and polyacrylic acids, polymers, co-polymers, derivatives and salts of acrylic and polyacrylic acids and compounds which contain acrylic and polyacrylic acids and polymers, co-polymers, derivatives and salts of acrylic and polyacrylic acids; lignin, in particular the lignin sulphonates, and compounds which contain lignin and derivatives of lignin. It will be understood, of course, that the invention is not restricted to the specific groups of compounds identified herein. Rather, it is intended to include compounds which have the property of reducing the surface activity of the individual metal particles as they precipitate from the solution to the extent that the formation of a metallic bond between individual particles is substantially inhibited.

The reducing reaction usually is conducted at a temperature within the range of from about 200° F. to 500° F. In addition to other factors, the addition agent of this invention is selected which is effective, or the decomposition products of which are effective, at the temperature at which the reaction is conducted. Furthermore, the addition agent is selected which does not contaminate objectionably the purity of the desired metal powder product, either by its presence in the solution, or by the presence of its decomposition products.

The improvement which constitutes the present invention is described in detail hereinafter as applied to the production of copper as metal powder from an aqueous solution in which the copper values are present as dissolved salts or both as dissolved salts and as a suspension of basic copper salts precipitated by the necessary adjustment with acid or alkali to suit the requisite reduction conditions.

Certain specifications have been set for the physical characteristics of copper metal in powder form by the users of copper powder in the powder metallurgy trade and it is desirable to produce powder to meet these specifications to facilitate the marketing of the powder. These specifications vary over a wide range although they are specific for any one particular application. For the purposes of illustration, typical specifications for some of the physical characteristics are given in Table I.

TABLE I

| Screen Analysis | A | B | C | D | E | F |
|---|---|---|---|---|---|---|
| +100 | 0.2 max | 0.5 max | 0.1 max | Tr | 0.0-0.5 | 0.1 max. |
| -100 +150 | 1.0-10.0 | 5.0-15.0 | 0.5 max | 1.5 max | 2.0-5.0 | 3.0-13.0. |
| -150 +200 | 9.0-19.0 | 23.0-35.0 | 4.0 max | 7.0-11.0 | 5.0-11.0 | 17.0-27.0. |
| -200 +250 | 2.0-9.0 | 6.0-13.0 | 1.5 max | 1.0-3.0 | 0.5-3.0 | 5.0-12.0. |
| -250 +325 | 12.0-22.0 | 19.0-29.0 | 2.0-7.0 | 14.0-22.0 | 4.0-10.0 | 18.0-28.0. |
| -325 | 53.0-63.0 | 22.0-32.0 | 90.0 min | 65.0-75.0 | 74.0-87.0 | 33.0-43.0. |
| Apparent Density, gms./cc | 2.50-2.60 | 2.40-2.60 | 1.50-1.75 | 2.70-2.80 | 1.10-1.35 | 2.54-2.55. |

The production of copper is used to illustrate the operation of the invention, as it is in the production of copper by gas reduction from solution that the problem of agglomeration and plastering is particularly attendant. It will be understood, however, that the improvement of the present invention is not restricted to the production of copper. Rather, it can be employed with advantage in the production of other metals such as silver, nickel and cobalt.

Factors which affect the production of copper from an aqueous solution in which it is present as a dissolved salt by reacting the solution with a reducing gas at elevated temperature and pressure include, but are not necessarily limited to, the copper, the neutralizing agent employed and the pH value of the solution, the reducing gas employed, and the temperature and pressure at which the reaction is conducted. The aqueous solution subjected to treatment by the improved method of this invention can be acidic or basic. Acid solutions will usually be in the form of sulphate, fluosilicate, or acetate solutions. Basic solutions usually will be in the form of sulphate, carbonate or acetate solutions. Both cuprous and cupric carbonates are soluble in ammoniacal solutions. These factors are described in detail in United States Patent No. 2,734,821. For the purpose of illustrating the operation of the invention, the production of copper from a solution, or a suspension of basic copper salts in a copper bearing solution, is considered in which the essential acid radical is sulphate. The best results are obtained in the reduction of copper from sulphate solutions when the reducing reaction is conducted on a solution which contains from about 10 to about 110 grams per litre copper, from about 1 to about 3.0 mols of free ammonia per mol of dissolved copper, from about 150 to about 450 grams of ammonium sulphate per litre of solution. The term "free" ammonia is intended to mean the ammonia content which is measurable by titration with sulphuric acid. Carbon monoxide, hydrogen or other suitable reducing gas or mixtures thereof can be employed, of which hydrogen is preferred. Reduction preferably is conducted at a temperature within the range of from about 200° F. to about 500° F. and at a pressure within the range of from about 200 to about 700 pounds per square inch. The solution should be maintained throughout the reaction at a pH value within the range equivalent to from about 5% excess acid to about 3 mols free ammonia per mol of copper. As one mol of acid is formed for each mol of copper reduced, sufficient ammonia should be present either initially or added during the operation, to maintain the pH value within the desired range. It will be understood, of course, that the value of the improvement of the present invention is not restricted to any specific solution or slurry or specific conditions under which the reducing reaction is conducted.

It is pointed out that in adjusting the acidity conditions for reduction, there usually is precipitation of some copper as a basic copper compound. When the resulting slurry is subjected to reduction, the precipitated basic copper compound converts ultimately to copper metal powder as reduction proceeds.

In the following examples which illustrate the results which are obtainable in the use of the present invention, a number of the compounds are identified by trade names under which the substances are available. Of the substances employed in the following examples, acrylic acid is identified, Chemical Dictionary, fifth edition, as acroleic acid, ethylene carboxylic acid, vinylformic acid, propene acid, propenoic acid. "Acrysol" is a trademark of the Rohm and Haas Company for aqueous solutions of acrylic polymers. "Acrysol A 3" is a 25% by weight aqueous solution of polyacrylic acid. "Separan 2610(R)" is identified by Dow Chemical Company as high molecular weight acrylamide polymer hydrolytes having from 0.8% to about 10% of the amide groups of the polymer replaced by carboxyl groups and characterized by a viscosity of at least 4 centipoises for an aqueous 0.5 percent by weight solution of the polymer hydrolyte. The expression "acrylamide polymer hydrolyte" is inclusive of the hydrolytes of the monopolymer of acrylamide and also of hydrolytes of water-soluble copolymers of acrylamide with up to about 15 percent by weight of other suitable monomers such as alkyl esters of acrylic acid and methacrylic acid, methacrylamide, styrene, vinyl acetate, acrylonitrile, methacrylonitrile, vinyl alkyl ethers and vinyl and vinylidene chloride. "Lignosol" is a trademark of the Lignosol Chemical Company, for ammonium and metal salts of lignin sulphonic acid. "Marasperse" is a trademark of the Marathon Corporation for ammonium and metal salts of lignin sulphonic acid.

The improvement in the characteristics of the metal product is noticeable when only a minor amount of addition agent is added to the solution, for example, as little as 0.01 gram per litre and the improvement continues up to about 3 grams per litre. Increased amounts above 3 grams per litre do not result in such further improvement in the characteristics of the metal powder as to warrant the use of higher concentrations. Also, of course, consideration must be given to the contaminating effect of the production metal powder by the presence, in the solution, of high concentrations of the addition agents.

The following Table II illustrates the effect of the addition agents of the present invention in the production of copper metal powder from a slurry comprised of aqueous ammoniated solution which contained dissolved copper values as copper ammine sulphate and precipitated basic copper compounds.

TABLE II

Conditions of the tests were:

A slurry comprised of solution and precipitated basic copper compound contained 57.4 g. p. l. copper and 1.4 g. p. l. nickel.
Temperature—400° F.
Total pressure—500 p. s. i. g.
Initial $(NH_4)_2SO_4$ concentration—350 g. p. l.
$NH_3$ (free): Cu molar ratio—1.6:1
Reduction time—30 minutes
Range of Cu in reduced solution—0.5–1.0 g. p. l. Cu.
pH of end solution—1.9.

Temperature—400° F.
Initial $(NH_4)_2SO_4$ concentration—350 g. p. l.
$H_2$ partial pressure—300 p. s. i.
Total pressure—500 p. s. i. g.
$NH_3$:Cu molar ratio—1.6:1
Reduction time—30 minutes.

"Renex 30" is a trademark for a polyoxyethylene ether alcohol manufactured by the Atlas Powder Company as a non-ionic detergent.

"G 3300" is an alkyl aryl sulphonate manufactured by the Atlas Powder Company as an anionic emulsifier.

"Aerosol OT" is a brand name for pure di-octyl sodium sulpho-succinate manufactured by American Cyanamid Company as a wetting agent.

TABLE II
*Physical characteristics of Cu powder*

| Addition Agent | Amount Used | | Apparent Density, g./cc. | Screen Analysis | | | | | | | Observations |
|---|---|---|---|---|---|---|---|---|---|---|---|
| | g. p. l. | lb./t. of copper | | +35 Mesh | −35 +65 | −65 +100 | −100 +150 | −150 +200 | −200 +325 | −325 | |
| None used | | | 1.10 | 61.6 | 6.5 | 3.7 | 3.5 | 3.8 | 7.2 | 13.7 | plastering, spongy agglomerated powder. |
| | | | 0.70 | 22.7 | 14.3 | 7.3 | 7.8 | 9.9 | 18.5 | 19.7 | |
| Polyacrylic Acid | 0.2 | 8 | 1.52 | 2.3 | 4.7 | 4.9 | 6.7 | 8.8 | 21.0 | 51.6 | little plastering, some agglomerates. |
| | 0.5 | 20 | 0.59 | | | 1.0 | 4.1 | 7.4 | 27.5 | 60.0 | no plastering, some agglomerates. |
| Acrysol A3 (Rohm & Haas Company) | 0.25 | 10 | 1.27 | | 1.1 | 1.4 | 1.7 | 1.7 | 5.8 | 88.3 | no plastering, little agglomeration. |
| | 1.00 | 40 | 0.84 | | 3.1 | 2.9 | 3.6 | 1.3 | 5.8 | 83.3 | Do. |
| Separan 2610 (Dow Chemical Company) | 0.10 | 4 | 0.66 | 0.2 | 1.6 | 1.8 | 42 | 8.2 | 25.5 | 58.5 | powder adhered to walls, no agglomeration. |
| Lignosol XD Sodium Base (Lignosol Chemicals) | 0.25 | 10 | 0.72 | 0.1 | 23.8 | 34.0 | 13.8 | 6.2 | 6.3 | 15.8 | little plastering, some agglomeration. |
| Calcium lignosulphonate | 0.25 | 10 | 0.78 | | 33.6 | 19.2 | 8.5 | 4.7 | 8.2 | 25.8 | little plastering on impellors, no plastering on walls. |
| Marasperse C Calcium Base Ligno sulphonate (Marathon Corporation). | 0.25 | 10 | 0.78 | Nil | 33.6 | 19.2 | 8.5 | 4.7 | 8.2 | 25.8 | very little plastering, very little agglomeration. |
| | 0.50 | 20 | 0.73 | Nil | 3.5 | 20.0 | 15.8 | 10.7 | 13.0 | 37.0 | |
| | 1.0 | 40 | 0.65 | Nil | Nil | 0.8 | 2.0 | 5.6 | 25.4 | 66.2 | |

These examples illustrate that the problem of agglomeration and plastering can be largely overcome by the addition to the solution subjected to the reducing reaction of a finite amount of a compound of the group described above.

The addition agents tested and found both to improve the characteristics of the metal powder and to prevent plastering are those which lessen the surface activity at the liquid-solids interfaces of the metal particles dispersed in the solution and of the surfaces of the reaction vessel and associated parts exposed to the reaction charge. The following table illustrates the results obtained in the use of an addition agent which increases the surface activity at the liquid-solids interfaces of the metal particles and exposed parts of the reaction vessel.

TABLE III

Conditions:

The solution contained 57.4 g. p. l. copper and 1.4 g. p. l. nickel.

TABLE III

| Addition Agent | Amount Used | | Density | Screen Analysis (Mesh) | | | | | | | Observations |
|---|---|---|---|---|---|---|---|---|---|---|---|
| | g. p. l. | lbs./ton Cu | | +35 | −35 +65 | −65 +100 | −150 +150 | −150 +200 | −200 +325 | −325 | |
| | | | | Percent | Percent | Percent | Percent | Percent | Percent | Percent | |
| 0 | | | 0.70 | 22.7 | 14.3 | 7.3 | 7.8 | 9.9 | 18.5 | 19.7 | some plastering, spongy agglomerated powder. |
| Renex 30 | 1 | 40 | | (¹) | (¹) | (¹) | (¹) | (¹) | (¹) | (¹) | bad plastering on walls, baffles, agitator. Copper formed spongy lumps. |
| G 3300 | 1 | 40 | 1.09 | 2.8 | 4.9 | 2.6 | 6.0 | 6.0 | 13.7 | 64.0 | bad plastering. The small quantity of powder obtained was not agglomerated. |
| Aerosol OT | 0.1 | 4 | 0.98 | Nil | Nil | 0.3 | 1.4 | 4.6 | 16.2 | 77.5 | Do. |
| | 0.25 | 10 | | (¹) | (¹) | (¹) | (¹) | (¹) | (¹) | (¹) | plastering. Copper formed as a large spongy cake. |

¹ Omitted.

The following Table IV illustrates the effect of using increasing amounts of ammonium polyacrylate in the reduction of copper from aqueous solution or from a slurry of aqueous solution and precipitated basic copper compound. The slurry contained 45–55 g. p. l. copper, 2.5–3.5 g. p. l. nickel, 400–500 g. p. l. ammonium sulphate and had a free ammonia to copper molar ratio of 1.6:1. The copper powder was produced in a series of batch reductions termed densifications. That is, copper particles precipitated in any one densification were left in the reaction vessel until 11 charges of solution had been treated. At the end of the 11th charge, the copper particles were discharged from the reaction vessel. Reduction was conducted at 350° F. under a partial pressure of hydrogen of 350 pounds per square inch.

TABLE IV

| Addition Agent, g. p. l. | Percent— 325 mesh Screen size | Density, grams per cc. |
|---|---|---|
| 0 | 21.6 | 3.03 |
| 0.5 | 62.8 | 2.40 |
| 0.75 | 86.4 | 2.58 |
| 1.00 | 94.2 | 2.49 |

The effect of varying the ammonia to copper molar ratio is illustrated in the following Table V. The purpose of this series of tests was to investigate the effect of increasing the ammonia content of the solution and thus reduce corrosion of apparatus exposed to the solution. The constitution of the solution and the conditions of operation were the same as in Table IV above. "Acrysol A 3" neutralized with ammonium polyacrylate was used as the addition agent. 10 charges of solution were treated before removing the copper particles from the reaction vessel.

TABLE V

| Mol Ratio, NH₃: Cu | Addition Agent | Percent— 325 Mesh Screen size | Density, grams per cc. |
|---|---|---|---|
| 1.8 | Nil | .4 | 2.20 |
| 1.8 | 0.25 | 54.5 | 2.30 |
| 1.8 | 0.50 | 98.5 | 2.52 |
| 2.2 | 0.1 | 9.1 | 2.89 |
| 2.2 | 0.2 | 47.7 | 2.55 |
| 2.2 | 0.5 | 99.3 | 2.36 |

It will be noted from this table that minor variations in the ammonia content has no appreciable effect on the characteristics of the resulting product.

The improvement of the present invention in the production of metal powders from solutions by gas reduction possesses a number of important advantages. Precipitation of finely divided metal particles proceeds rapidly and agglomeration of individual particles into larger particles and lumps is substantially eliminated. Also, plastering of metal particles on the walls of the reaction vessel and associated parts exposed to the solution subjected to the reducing reaction is substantially eliminated. It is possible to control the reduction to produce metal particles within a predetermined size range merely by increasing or decreasing the number of solutions subjected to treatment before removing the metal particles from the reaction vessel. When extremely finely divided particles are desired, it is found that a product can be obtained of which from about 85% to about 99% passes through a 325 mesh standard Tyler screen, that is, they have a particle size less than about 0.043 millimetres. Also, it is possible to control the reduction to produce metal particles of a predetermined density merely by controlling the quantity of addition agent provided in the solution and by controlling the number of batches subjected to treatment before removing the metal particles from the reaction vessel. Furthermore, the reducing reaction can be conducted in the presence of an addition agent of this invention under conditions which minimize corrosion of equipment.

What we claim as new and desire to protect by Letters Patent of the United States is:

1. In a method of producing substantially oxide-free, non-ferrous metal powder of a metal having an oxidation-reduction potential between cadmium and silver inclusive, said method including the step of reacting an aqueous solution which contains a compound of at least one of said metals with a reducing gas at elevated temperature and pressure, the improvement which comprises providing in said solution a finite amount of an addition agent of the group consisting of acrylic and polyacrylic acids, polymers, co-polymers, derivatives and salts of acrylic and polyacrylic acids, compounds which contain acrylic and polyacrylic acids, and polymers, co-polymers, derivatives and salts of acrylic and polyacrylic acids, lignin and derivatives of lignin.

2. The method according to claim 1 in which the metal is a member of the group consisting of silver, copper, nickel and cobalt.

3. The method according to claim 1 in which the addition agent is present in the solution subjected to treatment in amount at least 0.01 gram per litre of solution.

4. In a method of producing substantially oxide-free, non-ferrous metal powder of a metal of the group consisting of silver, copper, nickel and cobalt, said method including the step of reacting an aqueous solution which contains a compound of at least one of said metals with a reducing gas at elevated temperature and pressure, the improvement which comprises providing in said solution a finite amount of an addition agent of the group consisting of acrylic and polyacrylic acids, polymers, co-polymers, derivatives and salts of acrylic and polyacrylic acids, and compounds which contain acrylic and polyacrylic acids, and polymers, co-polymers, derivatives and salts of acrylic and polyacrylic acids.

5. In a method of producing substantially oxide-free, non-ferrous metal powder of a metal of the group consisting of silver, copper, nickel and cobalt, said method including the step of reacting an aqueous solution which contains a compound of at least one of said metals with a reducing gas at elevated temperature and pressure, the improvement which comprises providing in said solution a finite amount of a surface active addition agent of the group consisting of lignin and derivatives of lignin.

6. In a method of producing substantially oxide-free, non-ferrous metal powder of a metal of the group consisting of silver, copper, nickel and cobalt, said method including the step of reacting an aqueous solution, in which at least one of said metals is present in the form of a compound of the group consisting of metal sulphate and metal carbonate, with a reducing gas at elevated temperature and pressure, the improvement which comprises providing in said solution a finite amount of an addition agent of the group consisting of acrylic and polyacrylic acids, polymers, co-polymers, derivatives and salts of acrylic and polyacrylic acids, compounds which contain acrylic and polyacrylic acids, and polymers, co-polymers, derivatives and salts of acrylic and polyacrylic acids, lignin and derivatives of lignin.

References Cited in the file of this patent

UNITED STATES PATENTS 2,740,708    Papee    Apr. 3, 1956